US012810598B2

(12) United States Patent
Outon et al.

(10) Patent No.: US 12,810,598 B2
(45) Date of Patent: Nov. 24, 2026

(54) ACCELERATED DATA COLLECTION USING TRANSFORMER ENCODING LAYERS FOR DATA SEPARATION

(71) Applicant: Deere & Company, Moline, IL (US)

(72) Inventors: Luis Pazos Outon, Mountain View, CA (US); Ashish Tendulkar, Mumbai (IN); Alok Talekar, Bangalore (IN); Nitin Surya, Hyderabad (IN)

(73) Assignee: Deere & Company, Moline, IL (US)

( * ) Notice: Subject to any disclaimer, the term of this patent is extended or adjusted under 35 U.S.C. 154(b) by 549 days.

(21) Appl. No.: 18/334,889

(22) Filed: Jun. 14, 2023

(65) Prior Publication Data

US 2024/0420457 A1 Dec. 19, 2024

(51) Int. Cl.

| | |
|---|---|
| ***G06V 10/778*** | (2022.01) |
| ***G06V 10/762*** | (2022.01) |
| ***G06V 10/764*** | (2022.01) |
| ***G06V 10/774*** | (2022.01) |
| ***G06V 10/82*** | (2022.01) |
| ***G06V 20/10*** | (2022.01) |
| ***G06V 20/13*** | (2022.01) |

(Continued)

(52) U.S. Cl.

CPC .......... *G06V 10/778* (2022.01); *G06V 10/763* (2022.01); *G06V 10/764* (2022.01); *G06V 10/7753* (2022.01); *G06V 10/82* (2022.01); *G06V 20/13* (2022.01); *G06V 20/17* (2022.01); *G06V 20/188* (2022.01); *G06V 20/70* (2022.01)

(58) Field of Classification Search

CPC .. G06V 10/778; G06V 10/763; G06V 10/764; G06V 10/7753; G06V 10/774; G06V 10/82; G06V 20/13; G06V 20/17; G06V 20/188; G06V 20/10; G06V 20/70; G06V 10/26; G06V 30/191; G06V 30/19107; G06F 18/23213; G06T 7/11; G06T 2207/10032; G06T 2207/20132; G06T 2207/30188

See application file for complete search history.

(56) References Cited

U.S. PATENT DOCUMENTS

| | | | | |
|---|---|---|---|---|
| 2018/0132422 | A1* | 5/2018 | Hassanzadeh | A01G 22/00 |
| 2019/0228224 | A1* | 7/2019 | Guo | G06N 3/08 |
| 2020/0302223 | A1* | 9/2020 | Dutta | G06F 16/58 |

(Continued)

OTHER PUBLICATIONS

Ren, Pengzhen, et al., A Survey of Deep Active Learning, arXiv:2009.00236v2, 40 pages, dated Dec. 5, 2021.

(Continued)

*Primary Examiner* — Oneal R Mistry
*Assistant Examiner* — Duy Tran
(74) *Attorney, Agent, or Firm* — Hanley, Flight & Zimmerman, LLC

(57) ABSTRACT

Techniques are disclosed herein that are directed towards using satellite image data to narrow down the search space for statistically significant and/or meaningful ground truth data. Various implementations include techniques for labeling agricultural image data using unsupervised clustering and/or active learning techniques. Additional or alternative implementations include collecting more detailed crop information from locations on the ground with a higher quality (e.g., especially representative of a particular crop) ground truth.

20 Claims, 7 Drawing Sheets

(51) Int. Cl.
*G06V 20/17* (2022.01)
*G06V 20/70* (2022.01)

(56) References Cited

U.S. PATENT DOCUMENTS

2021/0019522 A1* 1/2021 Xian ................. G06F 18/23213
2021/0103728 A1* 4/2021 Young .................. A01B 79/005

OTHER PUBLICATIONS

Bazi, Yakoub et al., Vision Transformers for Remote Sensing Image Classification, Remote Sens. 2021, 13, 516, MDPI, 20 pages, dated Feb. 1, 2021.
He, Kaiming et al., Masked Autoencoders Are Scalable Vision Learners, arXiv:2111.06377v3, Fair, 14 pages, dated Dec. 19, 2021.

* cited by examiner

ACCELERATED DATA COLLECTION USING TRANSFORMER ENCODING LAYERS FOR DATA SEPARATION

BACKGROUND

As agricultural data mining and planning becomes more commonplace, the amount of data analyzed, and the number of sources providing that data, is increasing rapidly. Agricultural data can be used in a variety of ways including crop yield prediction and/or diagnoses. For instance, image data can be processed using one or more machine learning models to generate agricultural predictions. More accurate agricultural predictions can be made by processing higher quality image data. However, as image quality increases, computational resources necessary to store and/or process the image data also increases. Consequently, processing agricultural data for agricultural predictions (e.g., for crop yield predictions) often requires significant data storage and data processing resources.

Collecting ground truth data that can be used as labels to train various agricultural machine learning models, such as remote sensing models that make inferences based on satellite imagery, may be difficult to scale. Deploying human agronomists to comprehensively collect data about (e.g., capture digital images of) crops and/or label them may be prohibitively costly and/or time consuming. Deploying human agronomists to randomly sample data about crops and label them may be less costly and time consuming, but may yield less statistically significant or meaningful ground truth data.

SUMMARY

Implementations described herein are directed towards using satellite data to narrow down the search space for statistically significant and/or meaningful ground truth data. More particularly, but not exclusively, techniques are described herein for labeling agricultural image data using unsupervised clustering and/or active learning techniques, so that more detailed crop information can be collected from locations on the ground with higher quality (e.g., especially representative of a particular crop) ground truth.

In some implementations, a label can indicate one or more crops captured in an instance of agricultural image data (e.g., one or more crops captured in a pixel of satellite image data that represents, for instance, a ten meter by ten meter plot of land). Once generated, the labeled instances of agricultural image data can be used for various types of agricultural processing, such as using the labeled instances of agricultural image data to train a crop classification model. The crop classification model can be trained, for instance, to process instances of image data (e.g., satellite imagery) to generate output predicting one or more crops captured in the instances of image data. Other types of agricultural machine learning models may be trained as well, such as various types of phenotyping models, crop yield prediction models, and so forth.

In some implementations, instances of agricultural satellite image data can be processed using an encoder model to generate an encoded representation of each instance of agricultural image data. In some implementations, the encoder model can be the encoder portion of a pre-trained crop identification model (e.g., an encoder portion of a pre-trained crop identification transformer model). In some of those implementations, the pre-trained crop identification model can be trained using supervised learning (e.g., trained using training image data where a given training instance includes image data and one or more labels identifying one or more crops captured in the corresponding image data). In other implementations, the encoder model may be an encoder portion of a model, such as a transformer model, that is not necessarily pre-trained. In this latter case, homogenous pixels may be clustered together to provide suitable starting points (e.g., centroids) for collecting ground truth labels for the pixels.

The encoded instances of agricultural image data are an intermediate representation of the agricultural image data (e.g., an embedding space representation of the agricultural image data). In some implementations, the intermediate representations of the image data are easier to linearly separate into different classes of crops. In other words, the encoded instances of agricultural image data are easier to linearly separate compared to the same (unencoded) instances of agricultural image data.

In some implementations, the agricultural image data can be separated using one or more clustering techniques. Clustering includes grouping a set of objects in such a way that the objects in the same group (i.e., a cluster) are more similar to each other than to those in other groups. For example, one or more agricultural satellite images can include a first group of pixels capturing wheat and a second group of pixels capturing barley. In some implementations, clustering techniques can be used to separate the encoded representations of the first group of pixels into a wheat cluster and the encoded representations of the second group of pixels into a barley cluster.

Various clustering techniques can use different definitions of what constitutes a cluster of objects and/or different techniques to find those clusters of objects within a data set. For example, hierarchical clustering can build clusters based on distance(s) between the objects; k-means clustering can represent each cluster as a single mean vector; distribution model clustering can represent each cluster using statistical distributions (e.g., multivariate normal distributions); etc.

In some implementations, the system can cluster a set of encoded instances of agricultural image data using k-means clustering, where the system partitions the n instances of image data into k clusters, and where each instance of image data corresponds to the cluster with the nearest mean (e.g., nearest cluster centroid). Additionally or alternatively, k-means clustering can minimize the within-cluster variance between instances of image data.

For example, the system can use k-means clustering to generate a plurality of clusters based on processing the encoded instances of agricultural image data and identify a centroid of each cluster in the plurality of clusters. For each cluster centroid, the system can identify a label indicating the type of crops captured in the corresponding pixel of agricultural satellite image data. In some implementations, the system can identify the centroid as a statistically significant and/or meaningful data instance. For example, the system can identify the location of a pixel of satellite image data corresponding to a given cluster centroid. In some implementations, the system can deploy a ground truth collection entity, such as a human reviewer, to the location captured in the pixel of satellite image data (e.g., the location captured in the pixel of satellite data corresponding to the cluster centroid) to collect a ground truth label (e.g., capture additional image data) of the location. Additionally or alternatively, the system can deploy an aerial vehicle (e.g., a helicopter, an airplane, a balloon, an unmanned aerial vehicle (UAV), a drone, one or more additional aerial vehicles, and/or combinations thereof) to the location captured in the pixel of satellite image data (e.g., the location captured in the pixel of satellite data corresponding to the cluster centroid) to capture additional image data of the location.

In some implementations, the system can generate a label corresponding to the satellite image pixel based on the additional image data captured at the corresponding location. For example, the system can deploy a UVA to capture additional image data at the location captured in the satellite image pixel corresponding to a given cluster centroid. The system can process the additional image data to determine the one or more crops captured in the additional image data. In some of those implementations, a ground truth collection entity such as a human reviewer can generate the label.

In some implementations, the labeled instances of agricultural image data corresponding to the cluster centroids can be used to train the crop classification model. For example, a given instance of agricultural image data can be processed using the crop classification model to generate predicted output indicating the crop captured in the given instance of agricultural image data (e.g., the crop captured in a given pixel of agricultural satellite imagery). The system can compare the predicted output with the label corresponding to the given instance of agricultural image data and can update one or more portions of the crop classification model based on the comparing.

In some implementations, the system can process the unlabeled instances of agricultural image data using the crop classification model to generate output. Additionally or alternatively, the system can identify one or more additional instances of agricultural image data to label based on the generated output. In some of those implementations, the system can use active learning techniques to identify the one or more additional instances of agricultural image data to label.

For example, the system can process the generated output and/or one or more of the remaining unlabeled instances of agricultural image data using active learning techniques to identify the one or more additional instances of agricultural image data that are statistically significant and/or meaningful to label. A variety of metrics can be used to determine the one or more additional instances of agricultural image data to label such as focusing on the confidence of the crop prediction model, focusing on the uncertainty of some instances of agricultural image data, focusing on identifying the boundaries between two classes and labeling instances of agricultural image data at the boundaries, one or more additional or alternative metrics, and/or combinations thereof.

In some implementations, the system can deploy a human reviewer and/or an aerial vehicle to collect ground truth (e.g., capture additional image data) at the location corresponding to the additional agricultural image data identified as statistically significant and/or meaningful via active learning. For example, the system can deploy the human reviewer and/or the aerial vehicle to the location captured in satellite image data corresponding to the additional intermediate instances of agricultural image data identified as statistically significant and/or meaningful, to capture additional image data of the location. The system can process the additional image data to determine the one or more crops captured in the additional image data. In some of those implementations, a human reviewer can generate the label indicating the crop(s) in the additional image data.

Additionally or alternatively, the system can update one or more portions of the crop prediction model based on the additional instances of agricultural image data and the corresponding new labels. For example, the system can process a given additional instance of agricultural image data using the crop classification model to generate additional predicted output (e.g., the additional predicted output predicting the one or more crops captured in the instance of agricultural image data). One or more portions of the crop classification model can be updated based on comparing the additional predicted output and the label corresponding to the given additional instance of agricultural image data.

In some implementations, the system can repeat the process of adding new labels to one or more additional instances of agricultural image data, using the one or more additional instances of agricultural image data and the corresponding new labels to update one or more portions of the crop classification model, processing the unlabeled instances in the agricultural image data set, identifying one or more further instances of agricultural image data to label using active learning (e.g., one or more further instances of agricultural image data which are statistically significant and/or meaningful), and generating labels identifying one or more types of crops captured in the one or more further instances of agricultural image data.

Accordingly, various techniques set forth herein are directed towards identifying statistically significant and/or meaningful instances of agricultural image data (e.g., particular pixels of satellite image data) to label. Compared to traditional approaches (e.g., having a human reviewer generate a label for each pixel of agricultural satellite image data, randomly selecting pixels of the agricultural satellite image data to label, etc.), implementations described herein reduce the total number of instances of agricultural image data necessary to label to predict highly accurate labels for the instances of agricultural image data. The system can conserve resources such as computing resources (processor cycles, memory, power, one or more additional resources, and/or combinations thereof), time, manpower, one or more additional or alternative resources and/or combinations thereof by reducing the total number of instances of agricultural image data to label.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
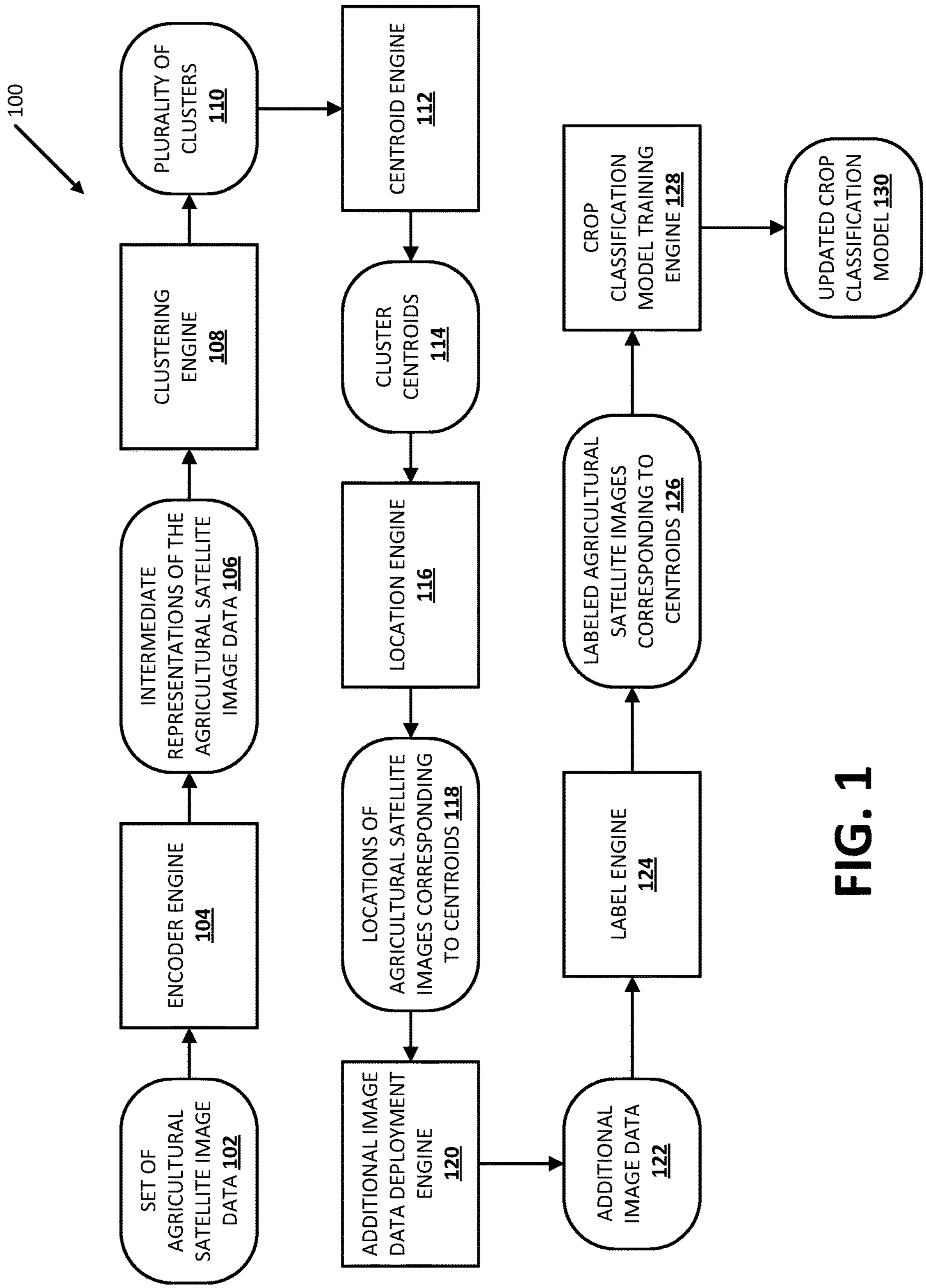
FIG. 1 illustrates an example of identifying statistically significant instances of agricultural satellite image data based on clustering intermediate representations of the agricultural satellite image data in accordance with various implementations disclosed herein.

Turning now to the figures, FIG. 1 illustrates an example of identifying statistically significant and/or meaningful instances of agricultural satellite image data based on clustering intermediate representations of the agricultural satellite image data in accordance with various implementations disclosed herein. The example 100 includes a set of agricultural satellite image data 102. In some implementations, each instance of agricultural satellite image data captures at least a portion of an agricultural plot. In some of those implementations, each instance of agricultural satellite image data captures one or more crops planted in the corresponding agricultural plot.

The set of agricultural satellite image data 102 can be processed using encoder engine 104 to generate a set of intermediate representations of the agricultural satellite image data 106. The encoder engine 104 can process the set of agricultural satellite image data 102 using an encoder model to generate a set of intermediate representations of the agricultural satellite image data 106. In some implementations, the encoder model can be an encoder portion of a pre-trained model which has been pre-trained to identify one or more crops captured in image data. In some of those implementations, the pre-trained model can be a recurrent neural network transformer (RNN-T) model, and the encoder can be the encoder portion of the RNN-T.

In some implementations, the intermediate representations of the agricultural satellite image data 106 are encoded representations of the agricultural satellite image data. In some of those representations, the encoded representations of the agricultural satellite image data are an embedding space representation of the agricultural image data. Additionally or alternatively, the intermediate representations of the image data is easier to linearly separate into different classes of crops. In other words, the encoded instances of agricultural image data are easier to linearly separate compared to the same (unencoded) instances of agricultural image data.

However, this is not meant to be limiting. One or more portions of additional and/or alternative pre-trained models can be used to generate the intermediate representation of the agricultural satellite image data such as a feedforward artificial neural network, multilayer perceptron network, a radial basis network, a long short-term memory network (LSTM), a convolutional neural network (CNN), one or more additional or alternative neural network models, and/or combinations thereof. For example, the agricultural satellite image data 102 can be processed using one or more portions of a convolutional neural network to generate filtered representations of the agricultural satellite image data 102, where the filtered representations can be used as the intermediate representations of the agricultural satellite image data 106.

The intermediate representations of the agricultural satellite image data 106 can be processed using clustering engine 108 to generate a plurality of clusters 110. In some implementations, each cluster, in the plurality of clusters 110, can correspond to a predicted crop captured in the instances of intermediate representations of the agricultural satellite image data 106. In other words, the agricultural satellite image data can be separated by crop type based on clustering the intermediate representations of the agricultural satellite image data. Clustering includes grouping a set of objects in such a way that the objects in the same group (i.e., a cluster) are more similar to each other than to those in other groups. For example, a set of agricultural image data can include a first group of images capturing wheat and a second group of images capturing barley. In some implementations, clustering techniques can be used to separate the encoded representations (e.g., the intermediate representations) of the first group of images into a wheat cluster and the encoded representations (e.g., the intermediate representations) of the second group of images into a barley cluster.

Various clustering techniques can use different definitions of what constitutes a cluster of objects and/or different techniques to find those clusters of objects within a data set. For example, hierarchical clustering can build clusters based on distance(s) between the objects; k-means clustering can represent each cluster as a single mean vector; distribution model clustering can represent each cluster using statistical distributions (e.g., multivariate normal distributions); etc. In some implementations, the system can cluster a set of encoded instances of agricultural image data using k-means clustering, where the system partitions the n instances of image data into k clusters, and where each instance of image data corresponds to the cluster with the nearest mean (e.g., nearest cluster centroid). Additionally or alternatively, k-means clustering can minimize the within-cluster variance between instances of image data.

The plurality of clusters can be processed using a centroid engine 112 to identify one or more cluster centroids 114 corresponding to each of the clusters. In some implementations, the system can identify the centroid as a statistically significant and/or meaningful data instance. The cluster centroids 114 can be processed by location engine 116 to generate the locations of the agricultural satellite image data corresponding to the cluster centroids 118. For example, the system can identify the location of a pixel of satellite image data corresponding to a given cluster centroid.

Additionally or alternatively, the locations of agricultural satellite images corresponding to the centroids 118 can be processed using additional image data deployment engine 120 to collect additional instances of image data 122. In some implementations, the additional image data deployment engine 120 can deploy a ground truth collection entity, such as a human reviewer, to the location captured in the pixel of satellite image data (e.g., the location captured in the pixel of satellite data corresponding to the cluster centroid) to collect a ground truth label (e.g., capture additional image data) of the location. Additionally or alternatively, the additional image data deployment engine 120 can deploy an aerial vehicle (e.g., a helicopter, an airplane, a balloon, an unmanned aerial vehicle (UAV), a drone, one or more additional aerial vehicles, and/or combinations thereof) to the location captured in the pixel of satellite image data (e.g., the location captured in the pixel of satellite data corresponding to the cluster centroid) to capture additional image data 124 of the location.

The additional image data 122 can be processed using label engine 124 to generate labeled instances of agricultural satellite images which correspond to the cluster centroids 126. In some implementations, the label engine 124 can generate a label corresponding to the satellite image pixel based on the additional image data captured at the corresponding location. For example, the additional image data deployment engine 120 can deploy a UVA to capture additional image data 122 at the location captured in the satellite image pixel corresponding to a given cluster centroid 118. In some implementations, the label engine 124 can process the additional image data 124 to determine the one or more crops captured in the additional image data. In some of those implementations, a ground truth collection entity such as a human reviewer can generate the label.

The labeled instances of agricultural satellite image data 126 can be processed using a crop classification model training engine 128 to generate an updated crop classification model 130. In some implementations, the labeled instances of agricultural image data corresponding to the cluster centroids 126 can be used to train the crop classification model. For example, a given labeled instance of agricultural image data 126 can be processed using the crop classification model to generate predicted output indicating the crop captured in the given instance of agricultural image data (e.g., the crop captured in a given pixel of agricultural satellite imagery). The crop classification model training engine 128 can compare the predicted output with the label corresponding to the given instance of agricultural image data and can update one or more portions of the crop classification model based on the comparing.

Figure 2:
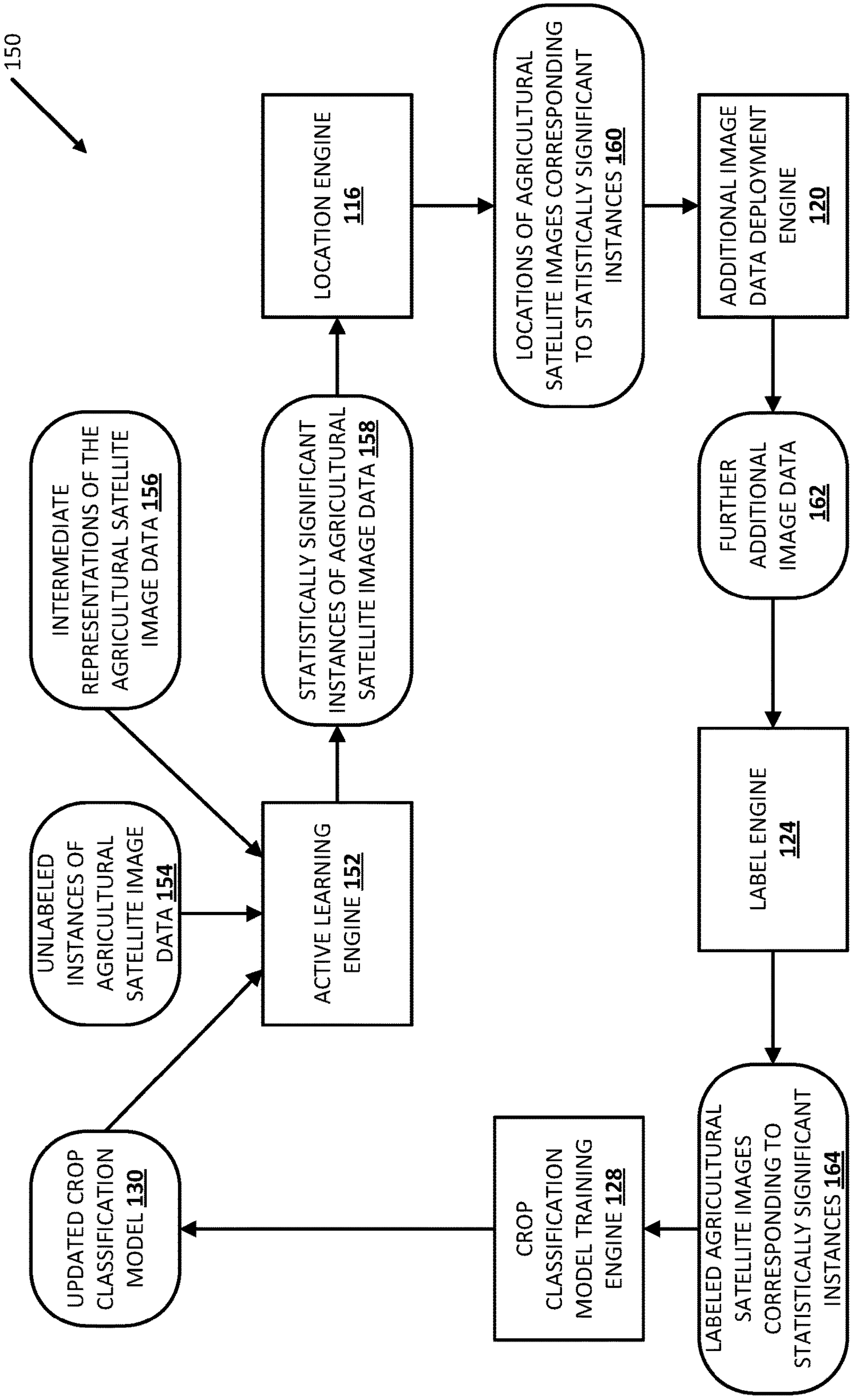
FIG. 2 illustrates an example of identifying statistically significant instances of agricultural satellite image data based on active learning in accordance with various implementations disclosed herein.

FIG. 2 illustrates an example of identifying statistically significant and/or meaningful instances of agricultural satellite image data using active learning in accordance with various implementations described herein. The example 150 includes an updated crop classification model 130, a set of unlabeled instances of agricultural satellite image data 154, and intermediate representations of the agricultural satellite image data 156. In some implementations, the updated crop classification model 130 is updated using crop classification model training engine 128 as described herein with respect to FIG. 1. In some implementations, the set of unlabeled instances of agricultural satellite image data 154 can include the set of agricultural satellite image data 102. In some of those implementations, the set unlabeled instances of agricultural satellite image data 154 can include the set of agricultural satellite image data 102 without the instances of agricultural satellite image data corresponding to cluster centroids 126 as described herein with respect to FIG. 1.

Active learning engine 152 can process the updated crop classification model 130, the set of unlabeled instances of agricultural satellite image data 154, and/or the intermediate representations of the agricultural satellite image data 156 to identify one or more statistically significant instances of agricultural satellite image data 158. Additionally or alternatively, location engine 116 can process the one or more statistically significant instances of agricultural satellite image data 158 to generate a set of locations of the agricultural satellite images corresponding to the statistically significant instances of agricultural satellite images 158. In some of those implementations, the system can process the one or more statistically significant instances of agricultural satellite image data 158 to generate the corresponding locations 160 using location engine 116 described herein with respect to FIG. 1.

In some implementations, additional image data deployment engine 120 can deploy one or more reviewers (e.g., a human reviewer, a UAV, etc.) to one or more of the locations 160 corresponding to statistically significant instances of image data to capture further additional image data 162. Label engine 124 can process the further additional image data 162 to generate one or more labeled instances of agricultural satellite images 164 corresponding to the statistically significant instances of satellite image data. Additionally or alternatively, crop classification model training engine 128 can process the labeled instances of agricultural satellite image data 164 to generate a further updated crop classification model 130.

Figure 3:
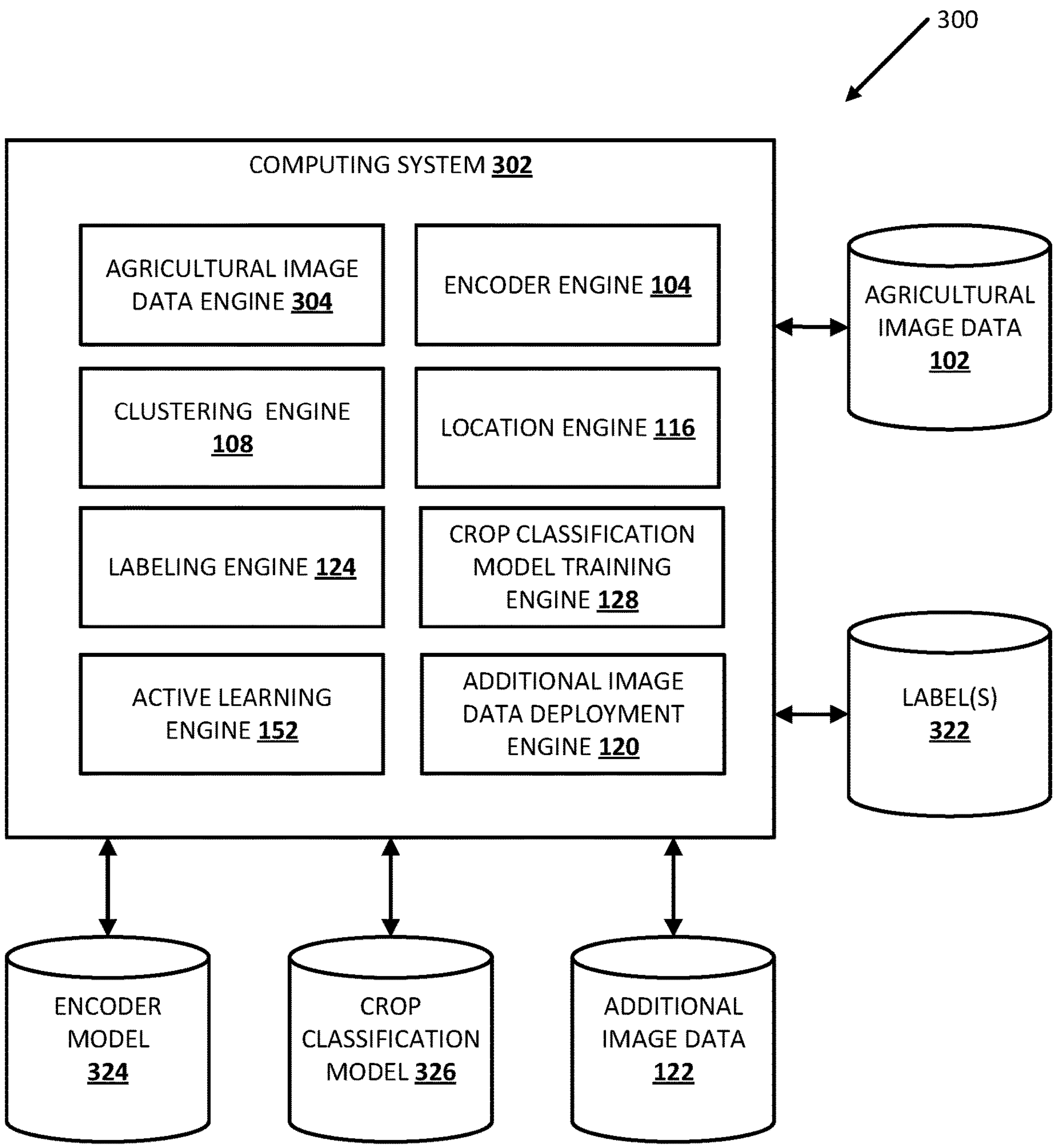
FIG. 3 illustrates an example environment in which various implementations disclosed herein may be implemented.

FIG. 3 illustrates a block diagram of an example environment 300 in which implementations disclosed herein may be implemented. The example environment 300 includes a computing system 302 which can include encoder engine 104, clustering engine 108, location engine 116, additional image data deployment engine 120, labeling engine 124, crop classification model training engine 128, active learning engine 152, agricultural image data engine 304, and/or one or more additional or alternative engines (not depicted). Additionally or alternatively, computing system 302 may be associated with agricultural image data 102, additional image data 122, one or more labels 322, encoder model 324, crop classification model 326, and/or one or more additional or alternative components (not depicted).

In some implementations, computing system 302 may include may include user interface input/output devices (not depicted), which may include, for example, a physical keyboard, a touch screen (e.g., implementing a virtual keyboard or other textual input mechanisms), a microphone, a camera, a display screen, and/or speaker(s). One or more user interface input/output devices (not depicted) may be incorporated with one or more computing systems 302 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 402 may be implemented on a computing system that also contains the user interface input/output devices.

Some non-limiting examples of computing system 302 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 302 may include one or more memories for storage of data and software applications, one or more processors for accessing data and executing applications, and other components that facilitate communication over a network. The operations performed by computing system 302 may be distributed across multiple computing devices. For example, computing programs running on one or more computers in one or more locations can be coupled to each other through a network.

In some implementations, agricultural image data engine 304 can identify one or more instances of agricultural satellite image data for processing. In some of those implementations, the agricultural image data engine 304 can identify one or more instances of agricultural image data 102, which can include satellite agricultural image data capturing one or more crops. For example, one or more crops can be captured in each pixel of the satellite image data that can represent, for instance, a ten meter by ten meter plot of land. Pixel(s) in the agricultural satellite image data can represent additional and/or alternative portion(s) of a plot of land (e.g., a one meter by one meter plot, a 100 meter by 100 meter plot, a one foot by one foot plot, etc.).

Encoder engine 104 can process the one or more instances of agricultural image data 102 using the encoder model 314 to generate one or more intermediate representations of the agricultural image data. In some implementations, the encoder model 314 can be the encoder portion of a pre-trained crop identification model (e.g., an encoder portion of a pre-trained crop identification transformer model). In some of those implementations, the pre-trained crop identification model can be trained using supervised learning (e.g., trained using training image data where a given training instance includes image data and one or more labels identifying one or more crops captured in the corresponding image data). In other implementations, the encoder model 314 may be an encoder portion of a model, such as a transformer model, that is not necessarily pre-trained. In this latter case, homogenous pixels may be clustered together to provide suitable starting points (e.g., centroids) for collecting ground truth labels for the pixels.

The encoded instances of agricultural image data are an intermediate representation of the agricultural image data 102 (e.g., an embedding space representation of the agricultural image data). In some implementations, the intermediate representations of the image data are easier to linearly separate into different classes of crops. In other words, the encoded instances of agricultural image data are easier to linearly separate compared to the same (unencoded) instances of agricultural image data.

In some implementations, clustering engine 108 can process the one or more intermediate representations of the image data to separate the one or more intermediate representations of the image data into one or more clusters. Clustering includes grouping a set of objects in such a way that the objects in the same group (i.e., a cluster) are more similar to each other than to those in other groups. For example, one or more agricultural satellite images can include a first group of pixels capturing wheat and a second group of pixels capturing barley.

Clustering engine 108 can use a variety of clustering techniques, where various clustering techniques can use different definitions of what constitutes a cluster of objects and/or different techniques to find those clusters of objects within a data set. For example, hierarchical clustering can build clusters based on distance(s) between the objects; k-means clustering can represent each cluster as a single mean vector; distribution model clustering can represent each cluster using statistical distributions (e.g., multivariate normal distributions); etc.

In some implementations, the clustering engine 108 can cluster the set of encoded instances of agricultural image data using k-means clustering, where the clustering engine 108 partitions the n instances of image data into k clusters, and where each instance of image data corresponds to the cluster with the nearest mean (e.g., nearest cluster centroid). Additionally or alternatively, k-means clustering can minimize the within-cluster variance between instances of image data.

In some implementations, a centroid engine (e.g., centroid engine 112 of FIG. 1) can identify one or more cluster centroids corresponding to each of the clusters. In some implementations, the system can identify the one or more centroid as statistically significant and/or meaningful data. For example, a label for the cluster centroid can correspond to additional data points in the same cluster.

The cluster centroids (e.g., the statistically significant and/or meaningful data points) can be processed using the location engine 116 to identify the location of the instance agricultural satellite image data 102 corresponding to a given cluster centroid. For example, the location engine 116 can identify a physical location corresponding to a given centroid (e.g., a latitude value and a longitude value representing the physical location of the given centroid).

In some implementations, an additional image data deployment engine (such as additional data deployment engine 120 can deploy a ground truth collection entity to capture one or more instances of additional image data 122 corresponding to the location of a given centroid. The additional data deployment engine 120 can deploy the ground truth collection entity, such as a human reviewer, to the location captured in the pixel of satellite image data (e.g., the location captured in the pixel of satellite data corresponding to the cluster centroid) to collect a ground truth label (e.g., capture additional image data) of the location. Additionally or alternatively, the system can deploy an aerial vehicle (e.g., a helicopter, an airplane, a balloon, an unmanned aerial vehicle (UAV), a drone, one or more additional aerial vehicles, and/or combinations thereof) to the location captured in the pixel of satellite image data (e.g., the location captured in the pixel of satellite data corresponding to the cluster centroid) to capture additional image data of the location.

In some implementations, the label engine 124 can generate a label 322 corresponding to the satellite image pixel based on the additional image data captured at the corresponding location. For example, the system can deploy a UVA to capture additional image data at the location captured in the satellite image pixel corresponding to a given cluster centroid. The system can process the additional image data to determine the one or more crops captured in the additional image data, and generate a label 322 based on the one or more crops captured in the additional instance of image data 122. In some of those implementations, a ground truth collection entity such as a human reviewer can generate the label.

In some implementations, crop classification model training engine 128 can process the labeled instances of agricultural satellite image data corresponding to the cluster centroids to generate output used in training the crop classification model 326. For example, a given instance of agricultural image data 102 can be processed using the crop classification model 326 to generate predicted output indicating the crop captured in the given instance of agricultural image data (e.g., the crop captured in a given pixel of agricultural satellite imagery). The system can compare the predicted output with the label 322 corresponding to the given instance of agricultural image data and can update one or more portions of the crop classification model 326 based on the comparing.

In some implementations, the system can process the unlabeled instances of agricultural image data 102 using the crop classification model 326 to generate output. For example, the system can process the generated output and/or one or more of the remaining unlabeled instances of agricultural image data 102 using the active learning engine 152 one or more additional instances of agricultural image data that are statistically significant and/or meaningful to label. A variety of metrics can be used to determine the one or more additional instances of agricultural image data to label such as focusing on the confidence of the crop prediction model, focusing on the uncertainty of some instances of agricultural image data, focusing on identifying the boundaries between two classes and labeling instances of agricultural image data at the boundaries, one or more additional or alternative metrics, and/or combinations thereof.

In some implementations, location engine 116 can be used to identify the location of the one or more additional instances of statistically significant and/or meaningful instances of agricultural image data 102. Similarly, the system can use additional image data deployment engine 120 to capture one or more corresponding additional instances of additional image data 122. The labeling engine 124 can process the one or more corresponding instances of additional image data to generate one or more labels 322 corresponding to the one or more additional instances of statistically significant and/or meaningful instances of agricultural image data 102. The labeled additional statistically significant and/or meaningful instances of agricultural image data can be processed using crop classification training engine 128 to generate output, where the output can be used to update one or more portions of crop classification model 326. Additionally or alternatively, active learning engine 152 can identify one or more further instances of statistically significant and/or meaningful instances of agricultural image data. Additional or alternative iterations of this process can be completed by the system to continue training the crop classification model 326.

Figure 4:
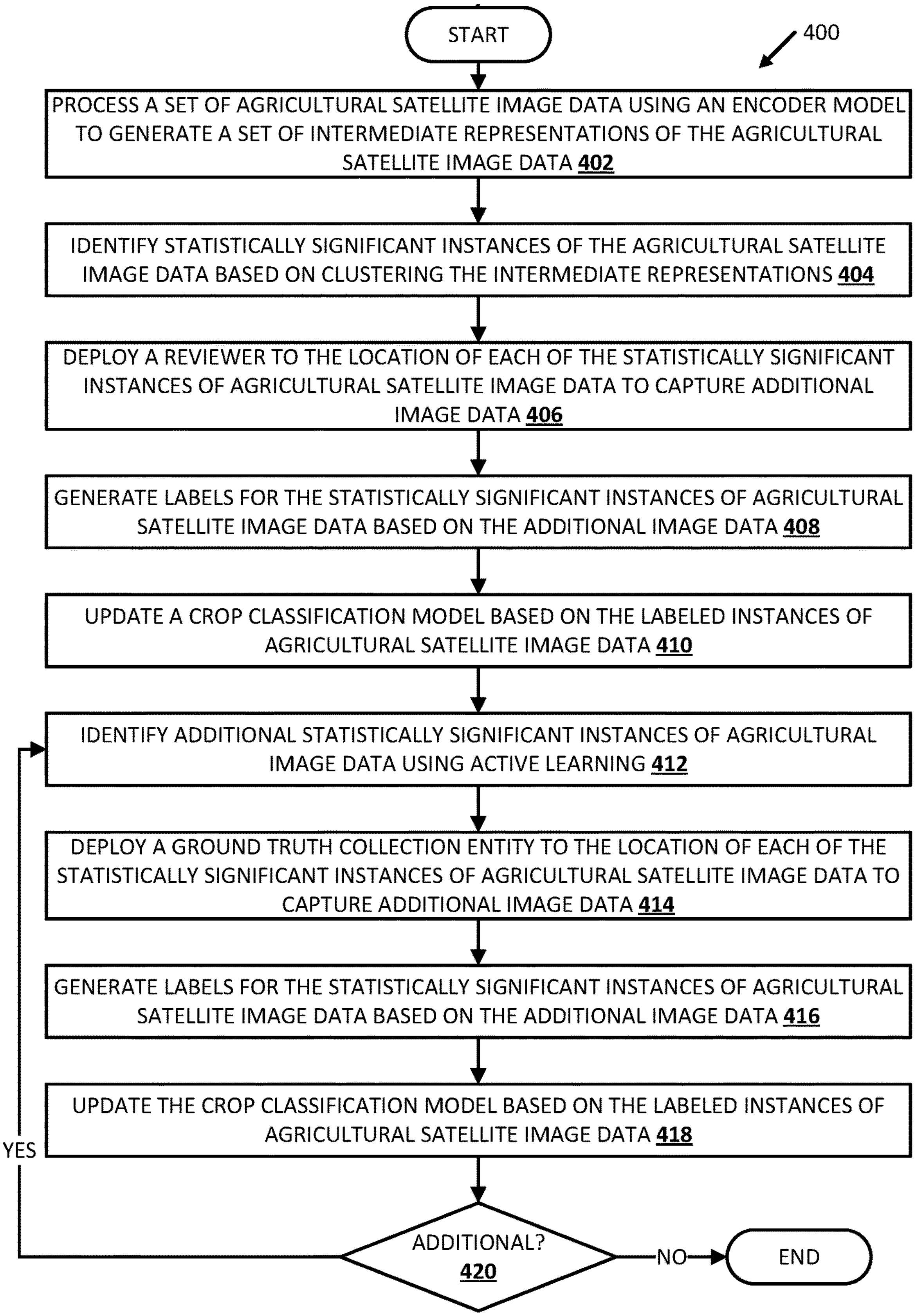
FIG. 4 is a flowchart illustrating an example process in accordance with various implementations disclosed herein.

FIG. 4 is a flowchart illustrating an example process 400 updating a crop classification model based on one or more statistically significant and/or meaningful unlabeled instances of agricultural satellite image data in accordance with implementations disclosed herein. For convenience, the operations of the flowchart are described with reference to a system that performs the operations. This system may include various components of various computer systems, such as one or more components of computing system 302, and/or computing system 710. Moreover, while operations of process 400 are shown in a particular order, this is not meant to be limiting. One or more operations may be reordered, omitted, and/or added.

At block 402, the system processes a set of agricultural satellite image data using an encoder model to generate a set of intermediate representations of the agricultural satellite image data. In some implementations, an instance of agricultural satellite image data, in the set of agricultural satellite image data, can capture one or more crops planted in an agricultural plot. In some of those implementations, each pixel in the instance of image data can represent a portion of the plot, for example, each pixel can represent a ten meter by ten meter plot of land. In some implementations, the encoder model can be an encoder portion of a pre-trained agricultural crop identification model (e.g., the encoder portion of a pre-trained crop identification transformer model). However, the encoder model is not necessarily pre-trained.

A given instance of the agricultural satellite image data can be processed using the encoder model to generate a corresponding intermediate representation of the given instance of agricultural satellite image data. In some implementations, the intermediate representation of an instance of agricultural satellite image data can be an embedding space representation of the instance of agricultural satellite image data. The intermediate representations of the image data are easier to linearly separate into different classes of crops.

At block 404, the system identifies one or more statistically significant and/or meaningful instances of the agricultural satellite image data based on clustering the intermediate representations of the agricultural satellite image data. In some implementations, the system can identify the one or more statistically significant and/or meaningful instances of the agricultural satellite image data based on clustering the intermediate representations of the agricultural satellite image data in accordance with block 504 and/or block 506 of FIG. 5 described herein.

At block 406, the system deploys a ground truth collection entity to the location of each of the statistically significant and/or meaningful instances of agricultural satellite image data to capture additional image data. In some implementations, the ground truth detection entity can include an aerial vehicle (e.g., a helicopter, an airplane, a balloon, an unmanned aerial vehicle (UAV), a drone, one or more additional aerial vehicles, and/or combinations thereof), where the aerial vehicle can be deployed to the physical location captured in the instance of agricultural satellite image data corresponding to the centroid of the cluster. Additionally or alternatively, the ground truth detection entity can include a human reviewer, where the human reviewer can be deployed to the physical location captured in the instance of agricultural satellite image data corresponding to the location of each of the statistically significant and/or meaningful instances of agricultural satellite image data (e.g., the centroid of the cluster).

In some implementations, one or more vision sensors of the ground truth detection entity can capture one or more additional instances of image data of the identified physical location. In some implementations, the one or more additional instances of image data captured by one or more vision sensors of the ground truth detection entity, such as one or more cameras, one or more Light Detection and Ranging (LIDAR) sensors, one or more satellite cameras, one or more additional or alternative vision sensors, and/or combinations thereof.

In some implementations, the one or more crops captured in the one or more additional instances of image data can be more easily identified (compared to the corresponding instance of agricultural satellite image data). For instance, the additional image data can be captured at a higher resolution compared to the agricultural satellite image data.

In some implementations, the additional instances of image data can include additional instances of agricultural satellite image data. For example, an additional instance of agricultural satellite image data can be captured by the ground trough detection entity using a higher resolution camera compared to the corresponding instance of agricultural satellite image data. Additionally or alternatively, an additional instance of agricultural satellite image data can be captured by the ground truth detection entity at a lower altitude (e.g., closer to the ground) compared to the corresponding instance of agricultural satellite image data.

At block 408, the system generates labels for the statistically significant instances of the agricultural satellite image data based on the additional image data. In some implementations the labels are generated based on the corresponding additional image data. For example, the one or more additional instances of image data can be processed using a crop classification model to identify one or more crops captured in the one or more additional instances of image data. Additionally or alternatively, a human can review the additional instances of image data to identify the one or more crops captured in the one or more additional instances of image data.

At block 410, the system updates a crop classification model based on the labeled instances of agricultural satellite image data. In some implementations, the system can process the one or more instances of agricultural image data (e.g., labeled at block 408) using the crop classification model to generate predicted output. Additionally or alternatively, one or more portions of the crop classification model can be updated based on comparing the predicted output and the generated label (e.g., the labeled generated at block 408)

At block 412, the system identifies one or more additional statistically significant and/or meaningful instances of the agricultural satellite image data using active learning. In some implementations, the system can identify one or more statistically significant and/or meaningful unlabeled instances of the agricultural satellite image data active learning techniques. A variety of metrics can be used to determine the one or more additional instances of agricultural image data to label such as focusing on the confidence of the crop prediction model, focusing on the uncertainty of some instances of agricultural image data, focusing on identifying the boundaries between two classes and labeling instances of agricultural image data at the boundaries, one or more additional or alternative metrics, and/or combinations thereof.

At block 414, the system deploys a ground truth collection entity to the location of each of the additional statistically significant and/or meaningful instances of the agricultural satellite image data. In some implementations, the system can deploy the ground truth collection entity as described herein with respect to block 406.

At block 416, the system generates labels for the additional statistically significant and/or meaningful additional instances of the agricultural satellite image data based on the additional image data. In some implementations the labels are generated based on the corresponding additional image data. For example, the one or more additional instances of image data can be processed using a crop classification model to identify one or more crops captured in the one or more additional instances of image data. Additionally or alternatively, a human can review the additional instances of image data to identify the one or more crops captured in the one or more additional instances of image data.

At block 418, the system updates the crop classification model based on the additional labeled instances of the agricultural satellite image data. In some implementations, the system can process the one or more labeled instances of agricultural image data (e.g., instances of image data labeled at block 416) using the crop classification model to generate predicted output. Additionally or alternatively, one or more portions of the crop classification model can be updated based on comparing the predicted output and the generated label (e.g., the labeled generated at block 416).

At block 420, the system determines whether to identify any more additional statistically significant and/or meaningful instances of the agricultural satellite image data. If so, the system proceeds back to block 412, identifies further instances of statistically significant and/or meaningful instances of the agricultural satellite image data using active learning, before proceeding to blocks 414, 416, 418, and 420 based on the further instances of statistically significant and/or meaningful instances of the agricultural satellite image data. If not, the process ends.

Figure 5:
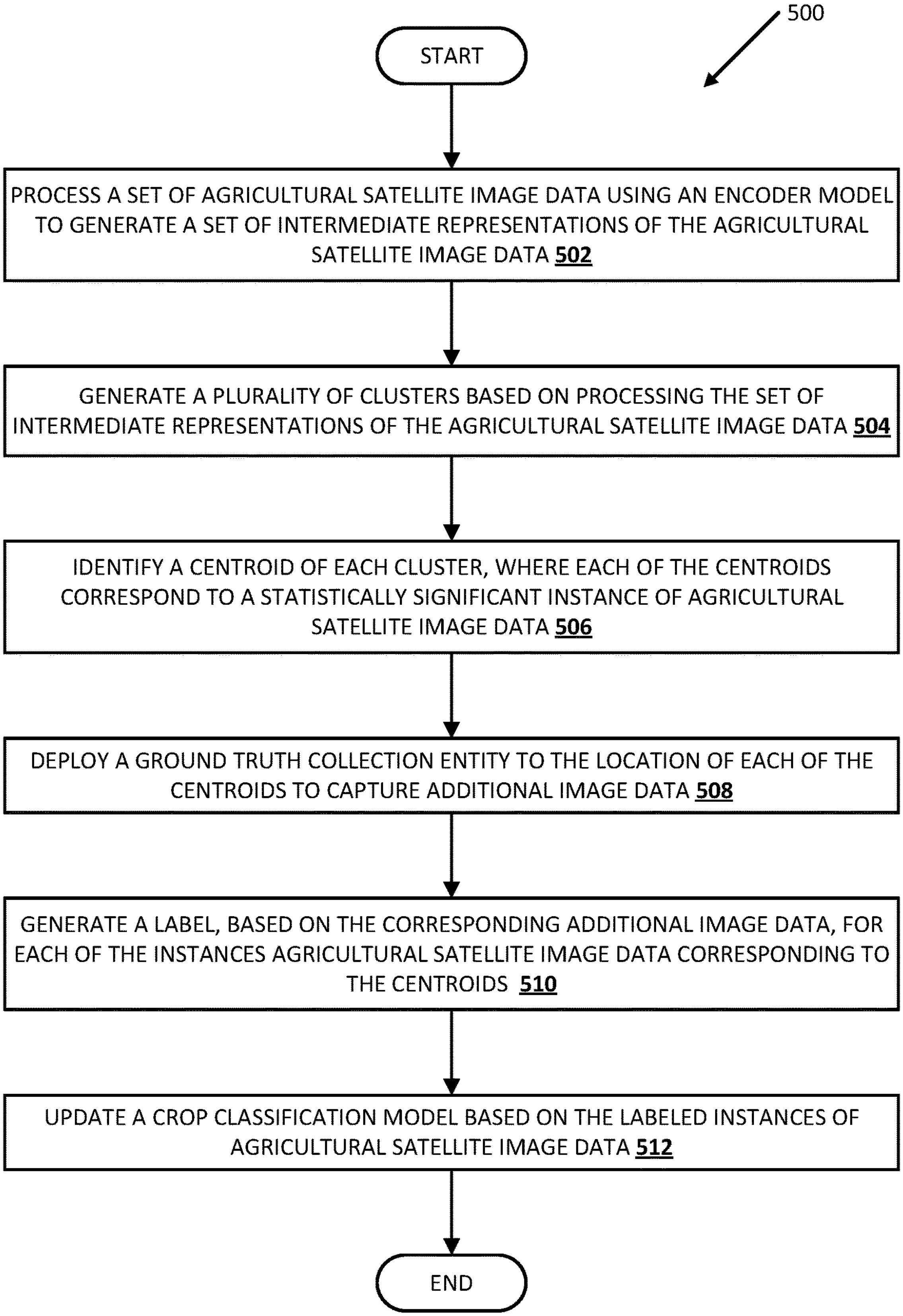
FIG. 5 is a flowchart illustrating another example process in accordance with various implementations disclosed herein.

FIG. 5 is a flowchart illustrating an example process 500 of updating a crop classification model based on labeled instances of agricultural satellite image data in accordance with implementations disclosed herein. For convenience, the operations of the flowchart are described with reference to a system that performs the operations. This system may include various components of various computer systems, such as one or more components of computing system 302, and/or computing system 710. Moreover, while operations of process 500 are shown in a particular order, this is not meant to be limiting. One or more operations may be reordered, omitted, and/or added.

At block 502, the system processes a set of agricultural satellite image data using an encoder model to generate a set of intermediate representations of the agricultural satellite image data. In some implementations, an instance of agricultural satellite image data, in the set of agricultural satellite image data, can capture one or more crops planted in an agricultural plot. In some of those implementations, each pixel in the instance of image data can represent a portion of the plot, for example, each pixel can represent a ten meter by ten meter plot of land. In some implementations, the encoder model can be an encoder portion of a pre-trained agricultural crop identification model (e.g., the encoder portion of a pre-trained crop identification transformer model). However, the encoder model is not necessarily pre-trained.

A given instance of the agricultural satellite image data can be processed using the encoder model to generate a corresponding intermediate representation of the given instance of agricultural satellite image data. In some implementations, the intermediate representation of an instance of agricultural satellite image data can be an embedding space representation of the instance of agricultural satellite image data. The intermediate representations of the image data are easier to linearly separate into different classes of crops.

At block 504, the system generates a plurality of clusters based on processing the set of intermediate representations of the agricultural satellite image data. Clustering includes grouping a set of objects in such a way that the objects in the same group (i.e., cluster) are more similar to each other than to those in other groups. For example, the system can generate a plurality of clusters of the intermediate representations of the agricultural satellite image data where each cluster corresponds to one or more distinct crops. However, one or more of the initial clusters, in the plurality of clusters, may contain one or more intermediate representations of the agricultural satellite image data that do not correctly correspond with the crop type of the majority of the intermediate representations in the given cluster. The system can use a variety of clustering techniques including (but not limited to) hierarchical clustering, k-means clustering, distribution model clustering, one or more additional or alternative clustering techniques, and/or combinations thereof.

At block 506, the system identifies a centroid of each cluster, where each of the centroids correspond to a statistically significant and/or meaningful instance of the agricultural satellite image data. In some implementations, the system can predict the crop(s) captured in a given cluster based on the crop(s) corresponding to the centroid of the given cluster. In some implementations, the centroid of a cluster can correspond to a single intermediate representation of an instance of the agricultural satellite image data. In some other implementations, the centroid of a cluster can correspond to one or more intermediate representations of instances of the agricultural satellite image data.

At block 508, the system deploys a ground truth detection entity to the location of each of the centroids to capture additional image data. In some implementations, the ground truth detection entity can include an aerial vehicle (e.g., a helicopter, an airplane, a balloon, an unmanned aerial vehicle (UAV), a drone, one or more additional aerial vehicles, and/or combinations thereof), where the aerial vehicle can be deployed to the physical location captured in the instance of agricultural satellite image data corresponding to the centroid of the cluster. Additionally or alternatively, the ground truth detection entity can include a human reviewer, where the human reviewer can be deployed to the physical location captured in the instance of agricultural satellite image data corresponding to the centroid of the cluster.

In some implementations, one or more vision sensors of the ground truth detection entity can capture one or more additional instances of image data of the identified physical location. In some implementations, the one or more additional instances of image data captured by one or more vision sensors of the ground truth detection entity, such as one or more cameras, one or more Light Detection and Ranging (LIDAR) sensors, one or more satellite cameras, one or more additional or alternative vision sensors, and/or combinations thereof.

In some implementations, the one or more crops captured in the one or more additional instances of image data can be more easily identified (compared to the corresponding instance of agricultural satellite image data). For instance, the additional image data can be captured at a higher resolution compared to the agricultural satellite image data.

In some implementations, the additional instances of image data can include additional instances of agricultural satellite image data. For example, an additional instance of agricultural satellite image data can be captured by the ground trough detection entity using a higher resolution camera compared to the corresponding instance of agricultural satellite image data. Additionally or alternatively, an additional instance of agricultural satellite image data can be captured by the ground truth detection entity at a lower altitude (e.g., closer to the ground) compared to the corresponding instance of agricultural satellite image data.

At block 510, the system generates a label for each of the instances of the agricultural satellite image data corresponding to the centroids. In some implementations the labels are generated based on the corresponding additional image data. For example, the one or more additional instances of image data can be processed using a crop classification model to identify one or more crops captured in the one or more additional instances of image data. Additionally or alternatively, a human can review the additional instances of image data to identify the one or more crops captured in the one or more additional instances of image data.

At block 512, the system updates a crop classification model based on the labeled instances of agricultural satellite image data. In some implementations, the system can process the one or more labeled instances of agricultural image data (e.g., instances of agricultural image data labeled at block 510) using the crop classification model to generate predicted output. Additionally or alternatively, one or more portions of the crop classification model can be updated based on comparing the predicted output and the generated label (e.g., the labeled generated at block 510).

Figure 6:
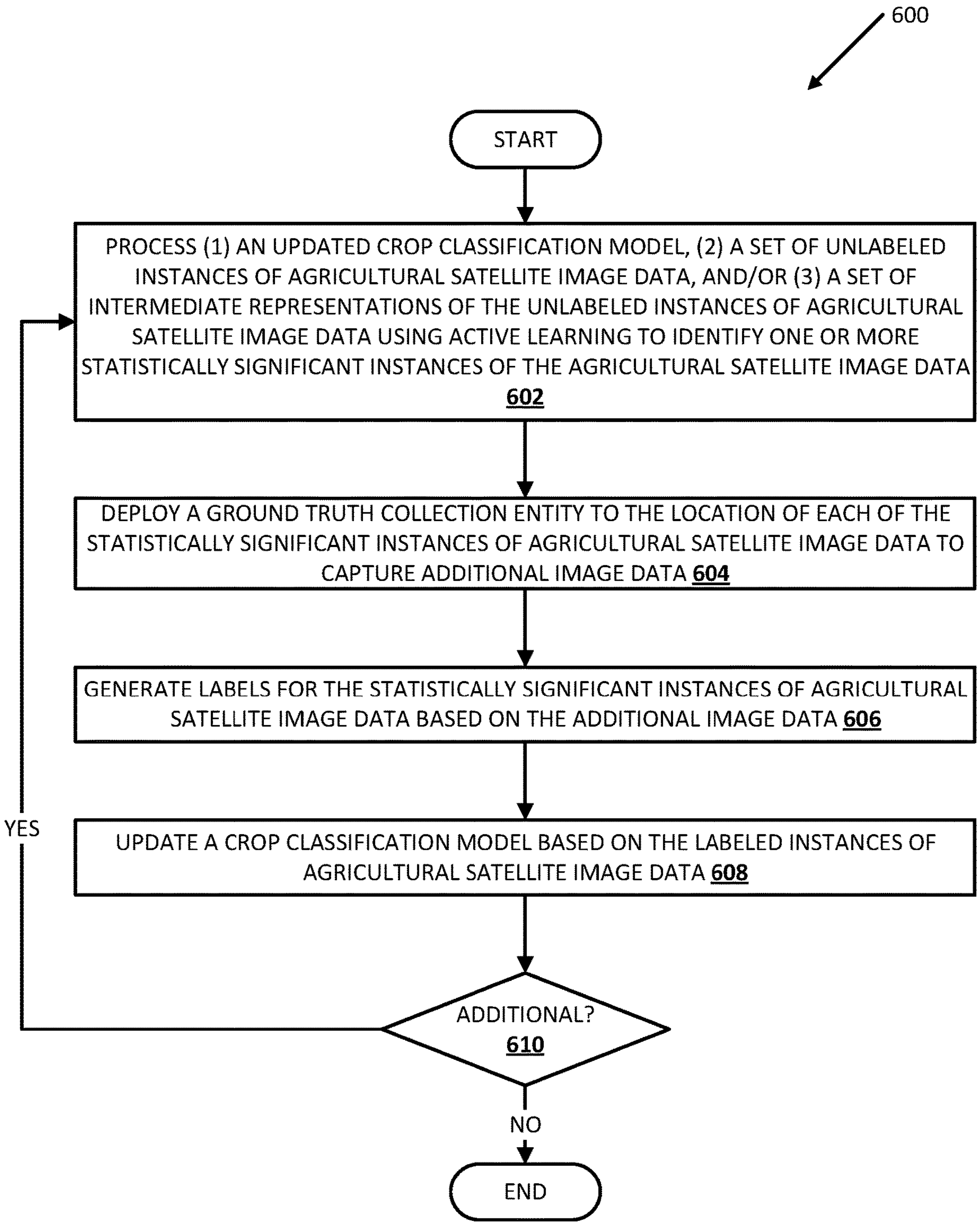
FIG. 6 is a flowchart illustrating another example process in accordance with various implementations disclosed herein.

FIG. 6 is a flowchart illustrating an example process 600 of identifying one or more statistically significant instances of unlabeled agricultural satellite image data using one or more active learning techniques and updating a crop classification model based on those identified statistically significant instances in accordance with implementations disclosed herein. For convenience, the operations of the flowchart are described with reference to a system that performs the operations. This system may include various components of various computer systems, such as one or more components of computing system 302, and/or computing system 710. Moreover, while operations of process 600 are shown in a particular order, this is not meant to be limiting. One or more operations may be reordered, omitted, and/or added.

At block 602, the system processes (1) an updated crop classification model, (2) a set of unlabeled instances of agricultural satellite image data, and/or (3) a set of intermediate representations of the unlabeled instances of the agricultural satellite image data, using active learning, to identify one or more statistically significant and/or meaningful instances of the agricultural satellite image data. In some implementations, the updated crop classification model can be generated in accordance with processes 400 and/or 500 of FIG. 4 and/or FIG. 5 described herein. In some implementations, the set of unlabeled instances of agricultural satellite image data can be determined on comparing an original set of agricultural satellite image data and the instances of satellite image data previously labeled, such as instance(s) labeled at block 510 of FIG. 5, instance(s) labeled at block 606 below, etc.

In some implementations, the system can identify one or more statistically significant and/or meaningful unlabeled instances of the agricultural satellite image data active learning techniques. A variety of metrics can be used to determine the one or more additional instances of agricultural image data to label such as focusing on the confidence of the crop prediction model, focusing on the uncertainty of some instances of agricultural image data, focusing on identifying the boundaries between two classes and labeling instances of agricultural image data at the boundaries, one or more additional or alternative metrics, and/or combinations thereof.

At block 604, the system deploys a ground truth collection entity to the location of each of the statistically significant and/or meaningful instances of agricultural satellite image data to capture additional image data. In some implementations, the ground truth detection entity can include an aerial vehicle (e.g., a helicopter, an airplane, a balloon, an unmanned aerial vehicle (UAV), a drone, one or more additional aerial vehicles, and/or combinations thereof), where the aerial vehicle can be deployed to the physical location captured in the instance of agricultural satellite image data corresponding to the centroid of the cluster. Additionally or alternatively, the ground truth detection entity can include a human reviewer, where the human reviewer can be deployed to the physical location captured in the instance of agricultural satellite image data corresponding to the centroid of the cluster. In some implementations, the system can deploy the ground truth detection entities in accordance with block 508 of FIG. 5 described herein.

At block 606, the system generates labels for the statistically significant and/or meaningful instances of agricultural satellite image data based on the additional image data. In some implementations the labels are generated based on the corresponding additional image data. For example, the one or more additional instances of image data can be processed using a crop classification model to identify one or more crops captured in the one or more additional instances of image data. Additionally or alternatively, a human can review the additional instances of image data to identify the one or more crops captured in the one or more additional instances of image data.

At block 608, the system updates a crop classification model based on the labeled instances of agricultural satellite image data. In some implementations, the system can process the one or more labeled instances of agricultural image data (e.g., instances of agricultural image data labeled at block 606) using the crop classification model to generate predicted output. Additionally or alternatively, one or more portions of the crop classification model can be updated based on comparing the predicted output and the generated label (e.g., the labeled generated at block 606).

At block 610, the system determines whether to identify any more additional statistically significant and/or meaningful instances of the agricultural satellite image data. If so, the system proceeds back to block 602, identifies further instances of statistically significant and/or meaningful instances of the agricultural satellite image data using active learning, before proceeding to blocks 604, 606, 608, and 610 based on the further instances of statistically significant and/or meaningful instances of the agricultural satellite image data. If not, the process ends. In some implementations, the system can determine whether to identify one or more additional statistically significant and/or meaningful instances of the agricultural satellite image data based on determining whether one or more conditions are satisfied including whether a predicted error rate for the crop classification model satisfies a threshold value, whether a threshold value of agricultural satellite image data have been labeled, whether one or more instances of unlabeled agricultural satellite image data are available, whether a threshold number of active learning iterations has been satisfied, whether one or more additional or alternative conditions are satisfied, and/or combinations thereof.

Figure 7:
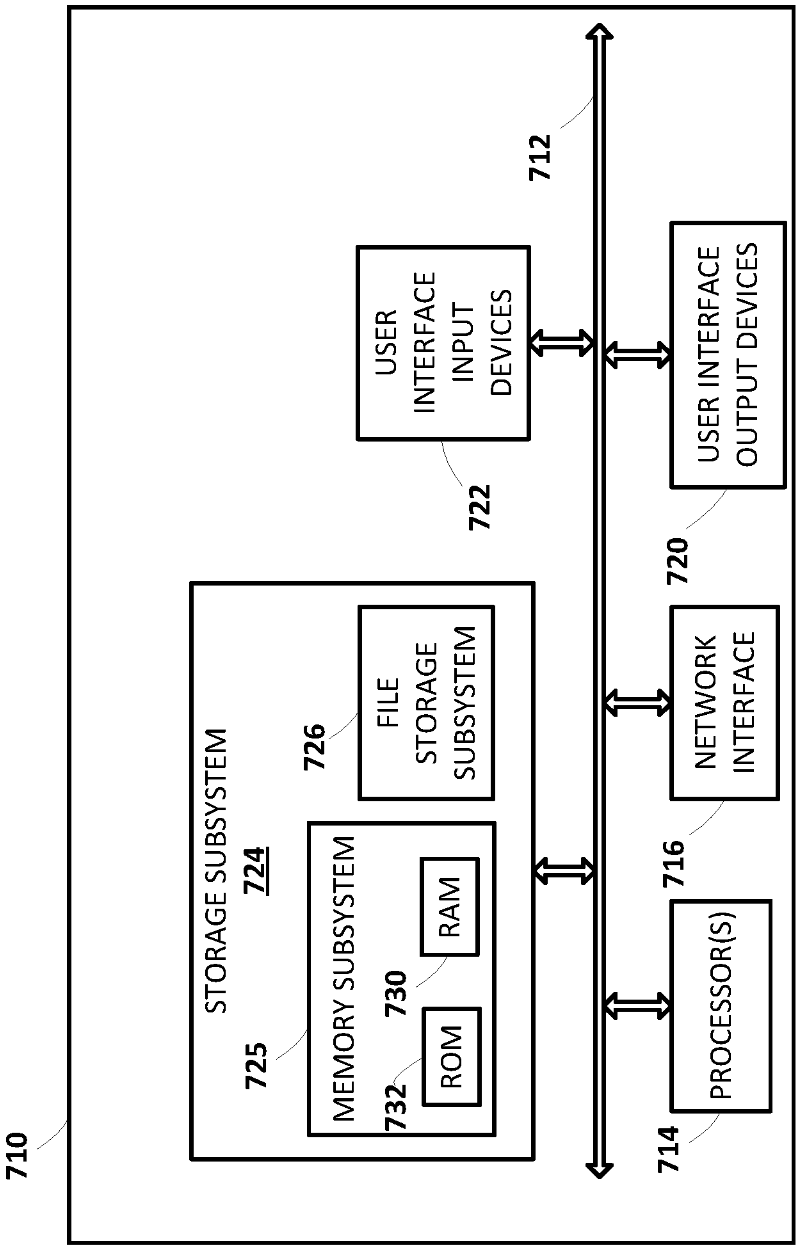
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 4, FIG. 5 and/or FIG. 6, as well as to implement various components depicted in FIG. 3.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes identifying a set of agricultural satellite image data, where each instance of agricultural satellite image data includes image data capturing at least a portion of an agricultural plot. In some implementations, for each instance of agricultural satellite image data, in the set of agricultural satellite image data, the method includes processing the image data portion using an encoder model to generate an intermediate representation of the instance of agricultural satellite image data. In some implementations, the method further includes processing each of the intermediate representations of the agricultural satellite image data to generate a plurality of clusters of the agricultural satellite image data. In some implementations, for each cluster, in the plurality of clusters, the method includes identifying a centroid of the cluster, wherein the centroid corresponds to one or more of the intermediate representations of the agricultural satellite image data in the cluster. In some implementations, the method includes generating output indicating a location of the agricultural plot captured in the agricultural satellite image data corresponding to the centroid of the cluster.

These and other implementations of the technology disclosed herein can include one or more of the following features.

In some implementations, for each cluster, in the plurality of clusters, the method further includes deploying a ground truth collection entity, to the location of the agricultural plot captured in the agricultural satellite image data corresponding to the centroid of the cluster, to collect additional image data of the agricultural plot. In some implementations, the method further includes generating a label for the instance of agricultural satellite image data based on the additional image data collected at the agricultural plot, wherein the label indicates the one or more crops captured in the instance of agricultural satellite image data. In some versions of those implementations, the ground truth collection entity is a human reviewer. In some versions of those implementations the ground truth collection entity is an unmanned aerial vehicle. In some versions of those implementations, for each of the labels generated based on additional image data collected at the locations of the agricultural plots captured in the agricultural satellite image data corresponding to the centroid of the clusters, the method further includes processing the corresponding instance of agricultural satellite image data using a crop classification model to generate predicted crop output, wherein the predicted crop output indicates one or more crops captured in the instance of agricultural satellite image data. In some versions of those implementations, the method further includes comparing the predicted crop output and the label generated based on the additional image data collected at the location corresponding to the instance of agricultural satellite image data. In some versions of those implementations, the method further includes updating one or more portions of the crop classification model based on comparing the predicted crop output and the label generated based on the additional image data collected at the location corresponding to the instance of agricultural satellite image data.

In some implementations, the method further includes processing, using active learning, the unlabeled instances of agricultural satellite image data and/or the corresponding intermediate representations of the agricultural satellite image data, in the set of agricultural satellite image data, to select one or more additional instances of agricultural satellite image data to label. In some implementations, for each of the additional instances of agricultural satellite image data selected to label, the method further includes generating additional output indicating the location of an additional agricultural plot captured in the additional instance of agricultural satellite image data. In some implementations, the method further includes deploying an additional ground truth collection entity, to the location of the additional agricultural plot captured in the additional instance of agricultural satellite image, to collect further image data of the additional agricultural plot. In some implementations, the method further includes generating an additional label for the additional instance of agricultural satellite image data based on the further image data collected at the additional agricultural plot, wherein the additional label indicates the one or more crops captured in the additional instance of agricultural satellite image data. In some implementations, the method further includes processing the additional instance of agricultural satellite image data using the crop classification model to generate additional crop prediction output, wherein the additional crop prediction output indicates the one or more crops captured in the additional agricultural plot captured in the additional instance of agricultural image data. In some implementations, the method further includes updating one or more portions of the crop classification model based on comparing the additional label and the additional crop prediction output.

In some versions of those implementations, the method further includes processing, using active learning, the unlabeled instances of agricultural satellite image data and/or the corresponding intermediate representations of the agricultural satellite image data, in the set of agricultural satellite image data, to select one or more further instances of agricultural satellite image data to label.

In some versions of those implementations, processing, using active learning, the unlabeled instances of agricultural satellite image data and/or the corresponding intermediate representations of the agricultural satellite image data, in the set of agricultural satellite image data, to select one or more additional instances of agricultural satellite image data to label further includes, for each unlabeled instance of agricultural image data, processing the unlabeled instance of agricultural satellite image data using the crop prediction model to generate candidate output, wherein the candidate output includes a confidence measure indicating the probability one or more crops are captured in the corresponding unlabeled instance of agricultural satellite image data. In some implementations, the method further includes selecting one or more of the additional instances of agricultural satellite image data based on the corresponding confidence measures.

In some versions of those implementations, processing, using active learning, the unlabeled instances of agricultural satellite image data and/or the corresponding intermediate representations of the agricultural satellite image data, in the set of agricultural satellite image data, to select one or more additional instances of agricultural satellite image data to label further includes identifying one or more of the unlabeled instances of agricultural satellite image data at the border of two or more clusters. In some versions of those implementations, the method further includes selecting the one or more additional instances of agricultural satellite image data to label based on the identified one or more of the unlabeled instances of agricultural satellite image data at the border of two or more clusters.

In some implementations, processing each of the intermediate representations of the agricultural satellite image data to generate the plurality of clusters of the agricultural satellite image data includes processing each of the intermediate representations of the agricultural satellite image data using k-means clustering to generate the plurality of clusters of the agricultural satellite image data. In some versions of those implementations, processing each of the intermediate representations of the agricultural satellite image data using k-means clustering to generate the plurality of clusters of the agricultural satellite image data is unsupervised clustering.

In some implementations, the encoder model is an encoder portion of a trained recurrent neural network transformer (RNN-T) model, wherein the RNN-T model is trained for crop classification using supervised learning.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

identifying a set of agricultural satellite image data, wherein an instance of agricultural satellite image data of the set of agricultural satellite image data includes image data capturing at least a portion of an agricultural plot;

for the instance of agricultural satellite image data, processing a portion of the image data using a trained encoder model to generate an intermediate representation of the instance of agricultural satellite image data;

processing the intermediate representation of the agricultural satellite image data to generate a plurality of clusters of the agricultural satellite image data;

for a cluster of the plurality of clusters:

identifying a centroid of the cluster, wherein the centroid corresponds to one or more intermediate representations of the agricultural satellite image data in the cluster; and generating an output indicating a location of the agricultural plot captured in the agricultural satellite image data corresponding to the centroid of the cluster;

processing, using active learning, at least one of an unlabeled, additional instance of agricultural satellite image data or corresponding intermediate representations of the agricultural satellite image data in the set of agricultural satellite image data to label; and for the additional instance of agricultural satellite image data selected to label:

generating an additional output indicating a location of an additional agricultural plot captured in the additional instance of agricultural satellite image data;

causing deployment of an additional ground truth collection entity to the location of the additional agricultural plot captured in the additional instance of agricultural satellite image data to collect further image data of the additional agricultural plot; and generating an additional label for the additional instance of agricultural satellite image data based on the further image data collected at the additional agricultural plot, wherein the additional label indicates one or more crops captured in the additional instance of agricultural satellite image data;

processing the additional instance of agricultural satellite image data using a crop classification model to generate a crop prediction output, wherein the crop prediction output indicates the one or more crops captured in the additional agricultural plot captured in the additional instance of agricultural image data; and updating one or more portions of the crop classification model based on comparing the additional label and the crop prediction output.

2. The method of claim 1, further including, for the cluster of the plurality of clusters:

causing deployment of a ground truth collection entity to the location of the agricultural plot captured in the agricultural satellite image data corresponding to the centroid of the cluster to collect additional image data of the agricultural plot; and generating a label for the instance of agricultural satellite image data based on the additional image data collected at the agricultural plot, wherein the label indicates the one or more crops captured in the instance of agricultural satellite image data.

3. The method of claim 2, wherein the ground truth collection entity is an unmanned aerial vehicle.

4. The method of claim 2, further including, for the label generated based on the additional image data collected at the location of the agricultural plot captured in the agricultural satellite image data corresponding to the centroid of the cluster:

processing the corresponding instance of agricultural satellite image data using the crop classification model to generate a predicted crop output, wherein the predicted crop output indicates the one or more crops captured in the instance of agricultural satellite image data;

comparing the predicted crop output and the label generated based on the additional image data collected at the location corresponding to the instance of agricultural satellite image data; and updating one or more portions of the crop classification model based on comparing the predicted crop output and the label generated based on the additional image data collected at the location corresponding to the instance of agricultural satellite image data.

5. The method of claim 1, further including processing, using the active learning, at least one of the unlabeled instance of agricultural satellite image data or the corresponding intermediate representations of the agricultural satellite image data in the set of agricultural satellite image data to select one or more further instances of agricultural satellite image data to label.

6. The method of claim 1, wherein processing, using the active learning, at least one of the unlabeled instance of agricultural satellite image data or the corresponding intermediate representations of the agricultural satellite image data, in the set of agricultural satellite image data, to select one or more additional instances of agricultural satellite image data to label includes, for each unlabeled instance of agricultural image data:

processing the unlabeled instance of agricultural satellite image data using the crop classification model to generate a candidate output, wherein the candidate output includes a confidence measure indicating a probability that the one or more crops are captured in the corresponding unlabeled instance of agricultural satellite image data; and selecting one or more of the additional instances of agricultural satellite image data based on the corresponding confidence measures.

7. The method of claim 1, wherein processing, using the active learning, at least one of the unlabeled instance of agricultural satellite image data or the corresponding intermediate representations of the agricultural satellite image data in the set of agricultural satellite image data to select one or more additional instances of agricultural satellite image data to label includes:

identifying one or more unlabeled instances of agricultural satellite image data at a border of two or more clusters; and selecting the one or more additional instances of agricultural satellite image data to label based on the identified one or more unlabeled instances of agricultural satellite image data at the border of the two or more clusters.

8. The method of claim 1, wherein processing the intermediate representation of the agricultural satellite image data to generate the plurality of clusters of the agricultural satellite image data includes processing the intermediate representation of the agricultural satellite image data using k-means clustering to generate the plurality of clusters of the agricultural satellite image data.

9. The method of claim 8, wherein processing each of the intermediate representations of the agricultural satellite image data using the k-means clustering to generate the plurality of clusters of the agricultural satellite image data is unsupervised clustering.

10. The method of claim 1, wherein the trained encoder model is an encoder portion of a trained recurrent neural network transformer (RNN-T) model, wherein the RNN-T model is trained for crop classification using supervised learning.

11. The method of claim 2, wherein the ground truth collection entity is a human reviewer.

12. A non-transitory computer-readable storage medium storing instructions executable by at least one processor of a computing system to at least:

identify a set of agricultural satellite image data, wherein an instance of agricultural satellite image data of the set of agricultural satellite image data includes image data capturing at least a portion of an agricultural plot;

for the instance of agricultural satellite image data, process a portion of the image data using a trained encoder model to generate an intermediate representation of the instance of agricultural satellite image data;

process the intermediate representation of the agricultural satellite image data to generate a plurality of clusters of the agricultural satellite image data;

for a cluster of the plurality of clusters:

identify a centroid of the cluster, wherein the centroid corresponds to one or more intermediate representations of the agricultural satellite image data in the cluster; and generate an output indicating a location of the agricultural plot captured in the agricultural satellite image data corresponding to the centroid of the cluster;

process, using active learning, at least one of an unlabeled, additional instance of agricultural satellite image data or corresponding intermediate representations of the agricultural satellite image data in the set of agricultural satellite image data to label; and for the additional instance of agricultural satellite image data selected to label:

generate an additional output indicating a location of an additional agricultural plot captured in the additional instance of agricultural satellite image data;

cause deployment of an additional ground truth collection entity to the location of the additional agricultural plot captured in the additional instance of agricultural satellite image data to collect further image data of the additional agricultural plot; and generate an additional label for the additional instance of agricultural satellite image data based on the further image data collected at the additional agricultural plot, wherein the additional label indicates one or more crops captured in the additional instance of agricultural satellite image data;

process the additional instance of agricultural satellite image data using a crop classification model to generate a crop prediction output, wherein the crop prediction output indicates the one or more crops captured in the additional agricultural plot captured in the additional instance of agricultural image data; and update one or more portions of the crop classification model based on comparing the additional label and the crop prediction output.

13. The non-transitory computer-readable storage medium of claim 12, wherein the instructions cause one or more of the at least one processor to, for the cluster of the plurality of clusters:

cause deployment of a ground truth collection entity to the location of the agricultural plot captured in the agricultural satellite image data corresponding to the centroid of the cluster to collect additional image data of the agricultural plot; and generate a label for the instance of agricultural satellite image data based on the additional image data collected at the agricultural plot, wherein the label indicates the one or more crops captured in the instance of agricultural satellite image data.

14. The non-transitory computer-readable storage medium of claim 13, wherein the ground truth collection entity is a human reviewer.

15. The non-transitory computer-readable storage medium of claim 13, wherein the instructions cause one or more of the at least one processor to, for the label generated based on the additional image data collected at the location of the agricultural plot captured in the agricultural satellite image data corresponding to the centroid of the cluster:

process the corresponding instance of agricultural satellite image data using the crop classification model to generate a predicted crop output, wherein the predicted crop output indicates the one or more crops captured in the instance of agricultural satellite image data;

compare the predicted crop output and the label generated based on the additional image data collected at the location corresponding to the instance of agricultural satellite image data; and update one or more portions of the crop classification model based on comparing the predicted crop output and the label generated based on the additional image data collected at the location corresponding to the instance of agricultural satellite image data.

16. The non-transitory computer-readable storage medium of claim 12, wherein the instructions cause one or more of the at least one processor to process, using the active learning, at least one of the unlabeled instance of agricultural satellite image data or the corresponding intermediate representations of the agricultural satellite image data in the set of agricultural satellite image data to select one or more further instances of agricultural satellite image data to label.

17. The non-transitory computer-readable storage medium of claim 12, wherein the instructions for processing the intermediate representation of the agricultural satellite image data to generate the plurality of clusters of the agricultural satellite image data cause one or more of the at least one processor to process the intermediate representation of the agricultural satellite image data using k-means clustering to generate the plurality of clusters of the agricultural satellite image data.

18. The non-transitory computer-readable storage medium of claim 12, wherein to process the intermediate representation of the agricultural satellite image data to generate the plurality of clusters of the agricultural satellite image data includes to process the intermediate representation of the agricultural satellite image data using k-means clustering to generate the plurality of clusters of the agricultural satellite image data.

19. The non-transitory computer-readable storage medium of claim 18, wherein to process the intermediate representation of the agricultural satellite image data using the k-means clustering to generate the plurality of clusters of the agricultural satellite image data is unsupervised clustering.

20. The non-transitory computer-readable storage medium of claim 13, wherein the ground truth collection entity is an unmanned aerial vehicle.

* * * * *